(12) United States Patent
Lin et al.

(10) Patent No.: US 11,378,856 B2
(45) Date of Patent: Jul. 5, 2022

(54) METHOD FOR MAINTAINING DISPLAY PANEL, DISPLAY SUBSTRATE, AND DISPLAY DEVICE

(71) Applicants: Fuzhou BOE Optoelectronics Technology Co., Ltd., Fujian (CN); BOE Technology Group Co., Ltd., Beijing (CN)

(72) Inventors: Chen Lin, Beijing (CN); Jinliang Wang, Beijing (CN); Yisong Ruan, Beijing (CN); Bo Wang, Beijing (CN); Shujuan Li, Beijing (CN); Zhangxiang Huang, Beijing (CN); Liangzhen Lin, Beijing (CN); Xi Chen, Beijing (CN); Yuchun Feng, Beijing (CN); Qian Zhang, Beijing (CN); Bin Yue, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/354,456

(22) Filed: Jun. 22, 2021

(65) Prior Publication Data
US 2022/0171243 A1    Jun. 2, 2022

(30) Foreign Application Priority Data
Nov. 27, 2020  (CN) .......................... 202011367019.1

(51) Int. Cl.
*G02F 1/1362* (2006.01)

(52) U.S. Cl.
CPC .. *G02F 1/136286* (2013.01); *G02F 1/136254* (2021.01); *G02F 1/136259* (2013.01)

(58) Field of Classification Search
CPC ......... G02F 1/136286; G02F 1/136254; G02F 1/136259; G02F 1/136213; G02F 1/134345; G02F 1/134363
See application file for complete search history.

(56) References Cited

U.S. PATENT DOCUMENTS

| 2008/0117349 A1 | 5/2008 | Chang et al. |
| 2018/0348586 A1 | 12/2018 | Li et al. |
| 2021/0405486 A1* | 12/2021 | Zhao ................. G02F 1/136213 |

FOREIGN PATENT DOCUMENTS

| CN | 201004141 Y | 1/2008 |
| CN | 101174067 A | 5/2008 |

(Continued)

*Primary Examiner* — James A Dudek
(74) *Attorney, Agent, or Firm* — WHDA, LLP

(57) ABSTRACT

A display substrate includes: a base substrate, as well as a first metal layer, a first insulating layer, a second metal layer, a second insulating layer, and a common electrode metal layer laminated on one side of the base substrate. The common electrode metal layer includes metal line segments and connecting line segments. The metal line segments include first metal line segments and second metal line segments. The connecting line segments connect the adjacent first and second metal line segments. Each connecting line segment is provided with a maintenance line segment. Orthographic projections of the maintenance line segments on the base substrate do not overlap those of gate lines and data lines on the base substrate. The spacing between the orthographic projections of the maintenance line segments and those of the gate lines and data lines is greater than or equal to a preset distance, which is greater than zero.

19 Claims, 11 Drawing Sheets

(56) References Cited

FOREIGN PATENT DOCUMENTS

| | | | |
|---|---|---|---|
| CN | 102213879 | A | 10/2011 |
| CN | 105527736 | A | 4/2016 |
| KR | 10-2007-0115463 | A | 12/2007 |

* cited by examiner

METHOD FOR MAINTAINING DISPLAY PANEL, DISPLAY SUBSTRATE, AND DISPLAY DEVICE

CROSS REFERENCE TO RELEVANT APPLICATIONS

The present disclosure claims the priority of the Chinese patent application filed on Nov. 27, 2020 before the Chinese Patent Office with the application number of 202011367019.1 and the title of "METHOD FOR MAINTAINING DISPLAY PANEL, DISPLAY SUBSTRATE, AND DISPLAY DEVICE", which is incorporated herein in its entirety by reference.

TECHNICAL FIELD

The present disclosure relates to the field of display technologies, and in particular, relates to a method for maintaining a display panel, the display substrate, and a display device.

BACKGROUND

Thin-film transistors are thin-film type semiconductor devices, and have been widely applied to fields such as display technologies and integrated circuit technologies. In a liquid-crystal display, each pixel unit is driven by the thin-film transistor integrated in the pixel unit, and thus may display picture information at high speed, high brightness, and high contrast ratio.

In the related art, a mesh-like common voltage metal layer is generally designed to increase the uniformity of the common voltage, thereby improving the quality of displayed pictures and solving display problems such as signal crosstalk and picture greening.

SUMMARY

The present disclosure provides a method for maintaining a display panel, the display substrate, and a display device.

The present disclosure discloses a display substrate, comprising:

a base substrate, as well as a first metal layer, a first insulating layer, and a second metal layer which are laminated on one side of the base substrate, wherein the first metal layer comprises a plurality of gate lines, and the second metal layer comprises a plurality of data lines; and a second insulating layer and a common electrode metal layer which are laminated on one side of the second metal layer away from the base substrate, wherein the second insulating layer is disposed close to the base substrate, and the common electrode metal layer comprises a plurality of metal line segments and a plurality of connecting line segments:

wherein the plurality of metal line segments comprises first metal line segments and second metal line segments, the first metal line segments extend along a direction of the data lines, and orthographic projections of the first metal line segments on the base substrate overlap orthographic projections of the data lines on the base substrate;

the second metal line segments extend along a direction of the gate lines, and orthographic projections of the second metal line segments on the base substrate overlap orthographic projections of the gate lines on the base substrate;

the connecting line segments are configured to connect the adjacent first and second metal line segments, each of the connecting line segments is provided with a maintenance line segment, orthographic projections of the maintenance line segments on the base substrate do not overlap the orthographic projections of the gate lines and data lines on the base substrate respectively, and a spacing between the orthographic projections of the maintenance line segments on the base substrate and the orthographic projections of the gate lines and data lines on the base substrate is greater than or equal to a preset distance, wherein the preset distance is greater than zero; and two adjacent second metal line segments and the connecting line segments connected to and disposed between the two adjacent second metal line segments jointly define a hollow area.

In an optional implementation, the preset distance is greater than or equal to 5 μm.

In an optional implementation, the maintenance line segments are disposed close to the first metal line segments.

In an optional implementation, an extension direction of the maintenance line segments is parallel to the gate lines.

In an optional implementation, the present disclosure further comprises:

a third insulating layer and a pixel electrode layer laminated between the second metal layer and the second insulating layer, wherein the third insulating layer is disposed close to the second metal layer, and the pixel electrode layer comprises a plurality of pixel electrodes;

a plurality of source-drain electrodes provided at each of the data lines, each of which is connected to the pixel electrode corresponding thereto via a via hole disposed in the third insulating layer; and a common electrode layer disposed at one side of the common electrode metal layer away from the base substrate.

In an optional implementation, a material of the third insulating layer comprises an organic insulating material.

In an optional implementation, a thickness of the third insulating layer is greater than or equal to 2000 Å.

In an optional implementation, each of the connecting line segments is further provided with a non-maintenance line segment, and the a non-maintenance line segment and the orthographic projections of the gate lines or the data lines on the base substrate have a spacing less than the preset distance therebetween or are partially overlapped.

In an optional implementation, overlapped areas of the orthographic projections of the gate lines and the data lines on the base substrate is within the hollow area.

The present disclosure further discloses a display device, comprising the display substrate stated above.

The present disclosure further discloses a method for maintaining a display substrate to perform maintenance specific to an abnormality in the display substrate stated above, the method comprising:

acquiring a type and position of the abnormality and determining a target metal line segment based on the type and position of the abnormality; and cutting off maintenance line segments between the target metal line segment and other metal line segments to isolate the target metal line segment, and performing maintenance specific to the abnormality by using the target metal line segment, wherein said other metal line segments are the metal segments among the plurality of metal line segments other than the target metal line segment.

In an optional implementation, when the type of the abnormality is disconnection of a first data line, the target metal line segment is a first metal line segment overlapping an orthographic projection of a disconnection position on the base substrate;

the first data line comprises a first data line segment and a second data line segment which are disposed at both ends of the disconnection position; and the method further comprises:

zapping a first area and a second area respectively, pouring metal powder into holes so that the first data line segment and the second data line segment are connected to the target metal line segment respectively, wherein an orthographic projection of the first area on the base substrate overlaps orthographic projections of the target metal line segment and the first data line segment on the base substrate respectively, and an orthographic projection of the second area on the base substrate overlaps orthographic projections of the target metal line segment and the second data line segment on the base substrate respectively.

In an optional implementation, the metal powder includes at least one of silver powder and tungsten powder.

In an optional implementation, when the type of the abnormality is shorting of a first gate line, the target metal line segment is a second metal line segment overlapping an orthographic projection of a shorting position on the base substrate;

the first data line comprises a first gate line segment and a second gate line segment which are disposed at both ends of the shorting position; and the method further comprises:

zapping a third area and a fourth area respectively, pouring metal powder into holes so that the first gate line segment and the second gate line segment are connected to the target metal line segment respectively, wherein an orthographic projection of the third area on the base substrate overlaps orthographic projections of the target metal line segment and the first gate line segment on the base substrate respectively, and an orthographic projection of the fourth area on the base substrate overlaps orthographic projections of the target metal line segment and the second gate line segment on the base substrate respectively.

In an optional implementation, when the type of the abnormality is shorting between a second gate line and a second data line, the target metal line segment comprises two first metal line segments which overlap an orthographic projection of the second data line on the base substrate and are close to a shorting position, and one second metal line segment which overlaps an orthographic projection of the second gate line on the base substrate and is close to the shorting position; and the method further comprises:

zapping a fifth area and a sixth area respectively, and pouring metal powder into holes so that the two first metal line segments are connected to the second data line respectively, wherein an orthographic projection of the fifth area on the base substrate overlaps orthographic projections of one of the first metal line segments in the target metal line segment and the second data line on the base substrate respectively, and an orthographic projection of the sixth area on the base substrate overlaps orthographic projections of the other of the first metal line segments in the target metal line segment and the second data line on the base substrate respectively.

In an optional implementation, the method further comprises:

cutting off conductive paths between two connecting points and the shorting position on the second data line respectively, and a conductive path between the shorting position and the first pixel electrode, wherein the connecting points are areas in which the second data line is connected to the first metal line segments in the target metal line segment; and the first pixel electrode is a pixel electrode connected to the first source-drain electrode, which is a source-drain electrode disposed between the two connecting points.

In an optional implementation, when the type of the abnormality is shorting between a third gate line and the second metal line segment, the target metal line segment is the second metal line segment undergoing shorting.

In an optional implementation, when the type of the abnormality is shorting between a third data line and the first metal line segment, the target metal line segment is the first metal line segment undergoing shorting.

In an optional implementation, the common electrode layer comprises a repair area, a non-repair area, and an isolation area disposed between the repair area and the non-repair area;

an orthographic projection of the repair area on the base substrate covers the orthographic projection of the target metal line segment on the base substrate; and the method further comprises:

removing the common electrode layer in the isolation area

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

For clearer descriptions of the technical solutions in the embodiments of the present disclosure, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

In order to make the above purposes, features and advantages of the present disclosure more apparent and understandable, the present disclosure will be described in further detail below with reference to the drawings and the particular embodiments. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

To increase the uniformity of common voltage and improve the quality of displayed pictures (in terms of crosstalk and greenish), a mesh-like common electrode metal layer is disposed in a display substrate in the related art. The common electrode metal layer covers gate lines and metal lines to improve the uniformity of common voltage while ensuring the aperture ratio and transmittance of pixels. However, the encountered problem is that the faults of the gate lines and data lines may not be eliminated by means of cutting-off or bridging and other maintenance modes.

Figure 1:
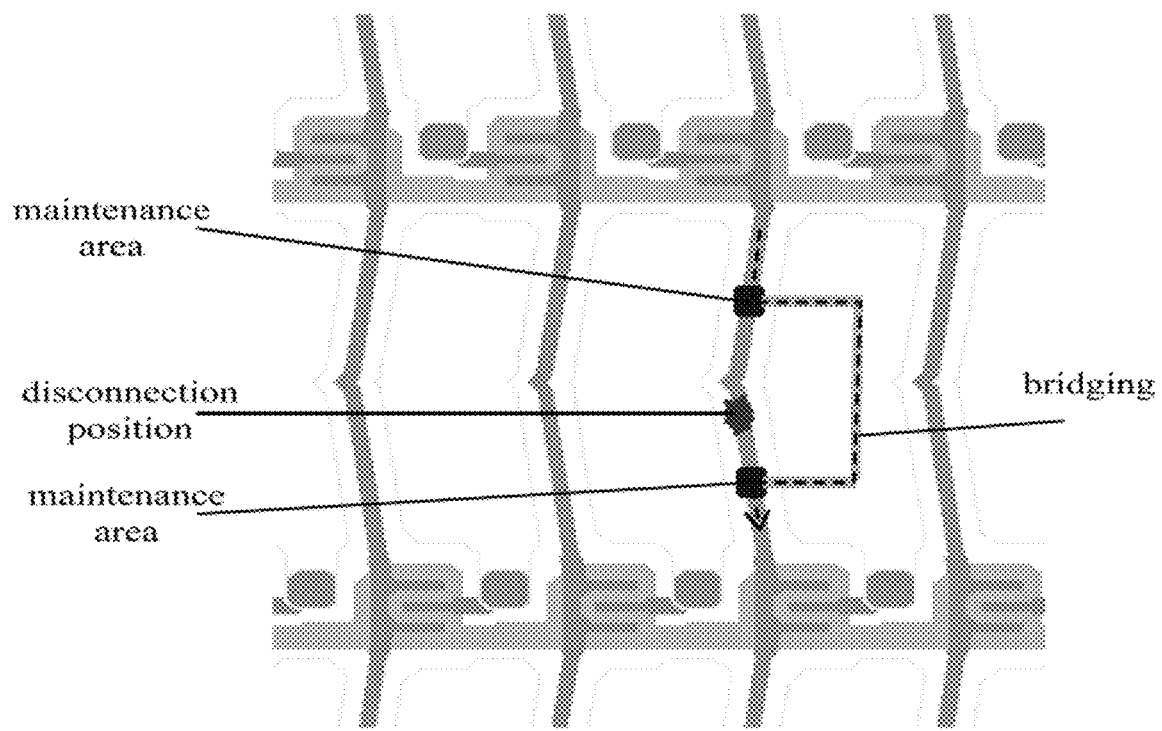
FIG. 1 illustrates a maintenance solution to data line disconnection of a display substrate without a common electrode metal layer in the related art.

For a product without the common electrode metal layer, a bridging maintenance solution may be used when a disconnection fault occurs to the data lines. As illustrated in FIG. 1, zapping is first performed on maintenance areas at both sides of a disconnection position; and tungsten powder is then poured into holes to connect the data lines and is used for bridging maintenance, wherein a dotted arrow indicates a transmission direction of data signals after the bridging maintenance.

Figure 2:
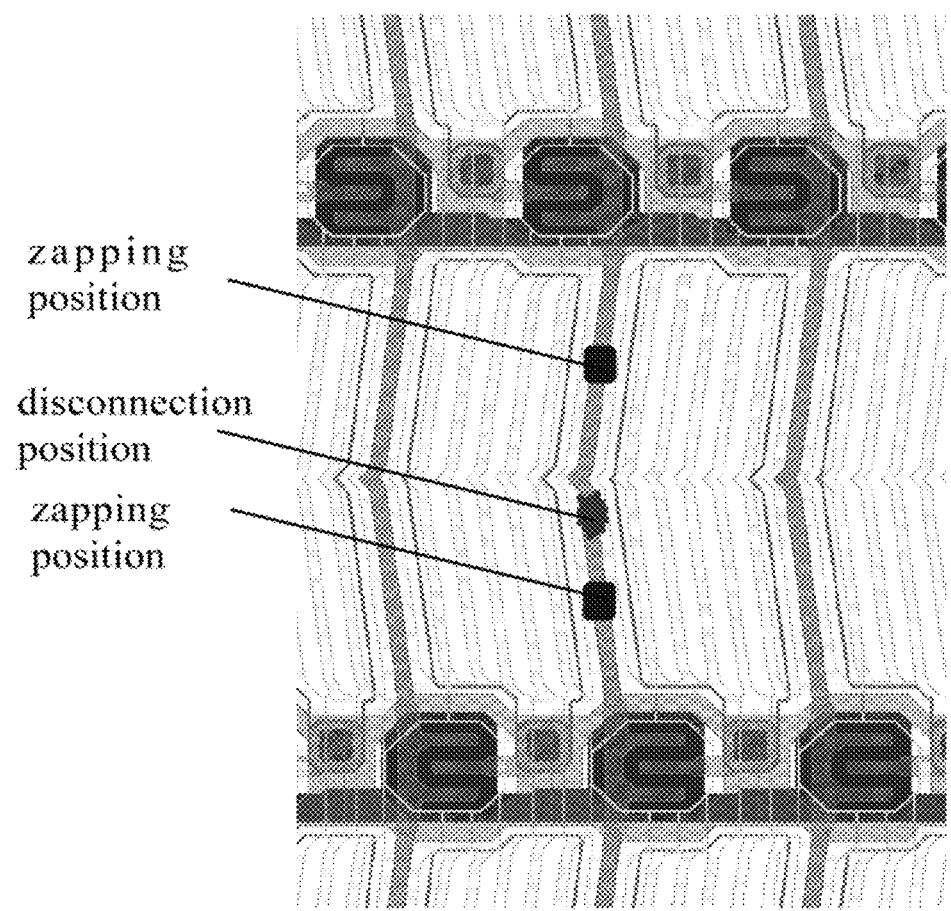
FIG. 2 illustrates a schematic diagram of a planar structure of a display substrate with a common electrode metal layer in the related art.

For a product with the common electrode metal layer (Top Metal Com), when a disconnection fault occurs to the data lines, referring to FIG. 2, the data lines at zapping positions may be shorted with the common electrode metal layer if the bridging maintenance solution is used, since the data lines are fully covered by the common electrode metal layer. Similarly, laser cutting may also cause shorting between metal lines (such as the gate lines or the data lines) and the common electrode metal layer. The laser cutting refers to the radiation ablation of a pulse laser and may cause damage and ablation to various film layers of cut sections, and the film layers which are not originally adjacent may be shorted at the cut sections. Therefore, if the common electrode metal layer overlaps the metal lines, the laser cutting of the common electrode metal layer may lead to shorting between the commmon electrode metal layer and the overlapped metal lines. As a result, the faults of the gate lines or the data lines may not be eliminated by means of cutting-off or bridging and other maintenance modes, and a huge loss of yield may be caused due to the failure in maintenance.

Figure 3:
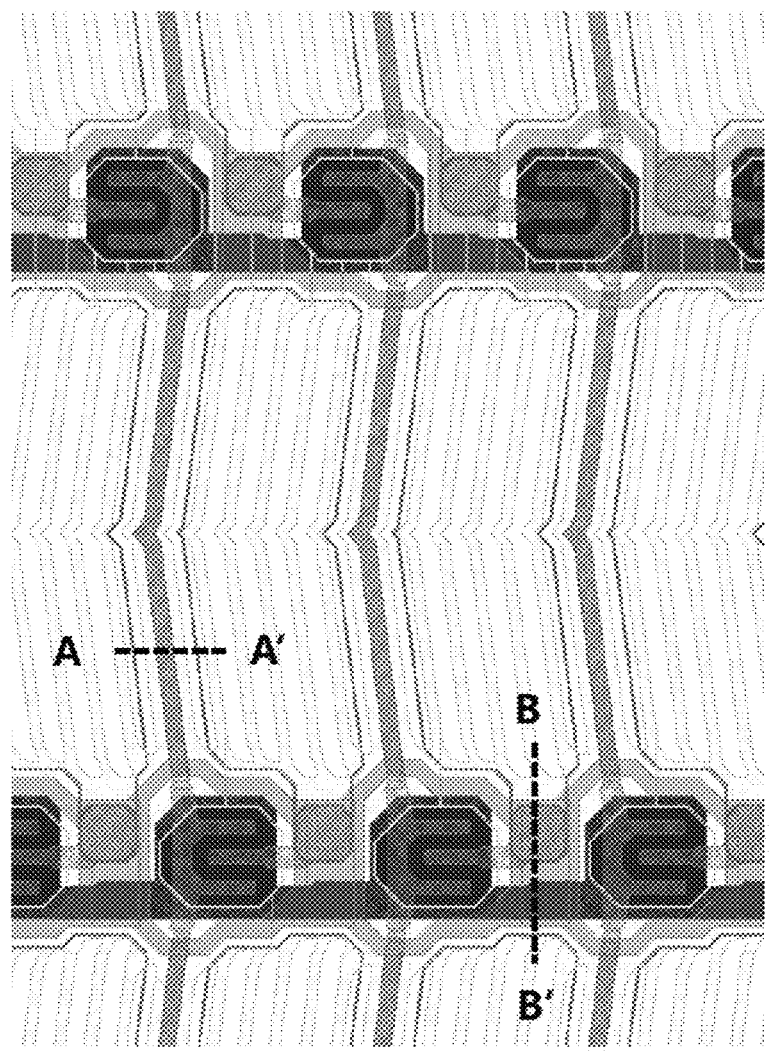
FIG. 3 illustrates a schematic diagram of a planar structure of a display substrate according to an embodiment.
Figure 4:
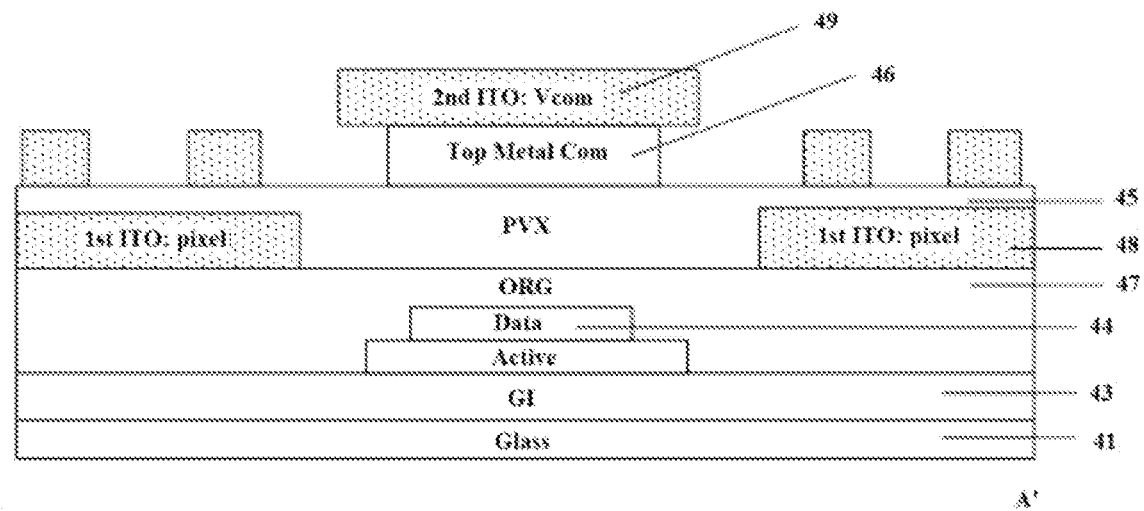
FIG. 4 illustrates a schematic diagram of a sectional structure of a display substrate along AA' according to an embodiment.
Figure 5:
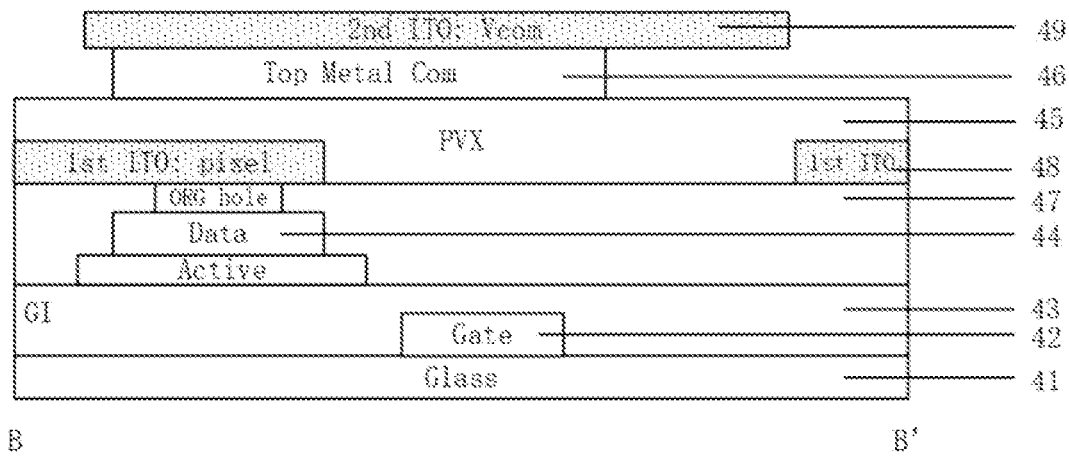
FIG. 5 illustrates a schematic diagram of a sectional structure of a display substrate along BB' according to an embodiment.

To improve the product yield, an embodiment of the present disclosure provides a display substrate. Referring to FIG. 3, it illustrates a schematic diagram of a planar structure of the display substrate according to this embodiment. Referring to FIG. 4, it illustrates a schematic diagram of a planar structure of the display substrate along AA' according to this embodiment. Referring to FIG. 5, it illustrates a schematic diagram of a sectional structure of the display substrate along BB' according to this embodiment. The display substrate includes:

a base substrate 41, as well as a first metal layer 42, a first insulating layer 43 and a second metal layer 44 which are laminated on one side of the base substrate 41, wherein the first metal layer 42 includes a plurality of gate lines, and the second metal layer 44 includes a plurality of data lines; and a second insulating layer 45 and a common electrode metal layer 46 which are laminated on one side of the second metal layer 44 away from the base substrate 41, wherein the second insulating layer 45 is disposed close to the base substrate 41, and the common electrode metal layer 46 includes a plurality of metal line segments and a plurality of connecting line segments 63.

Figure 6A:
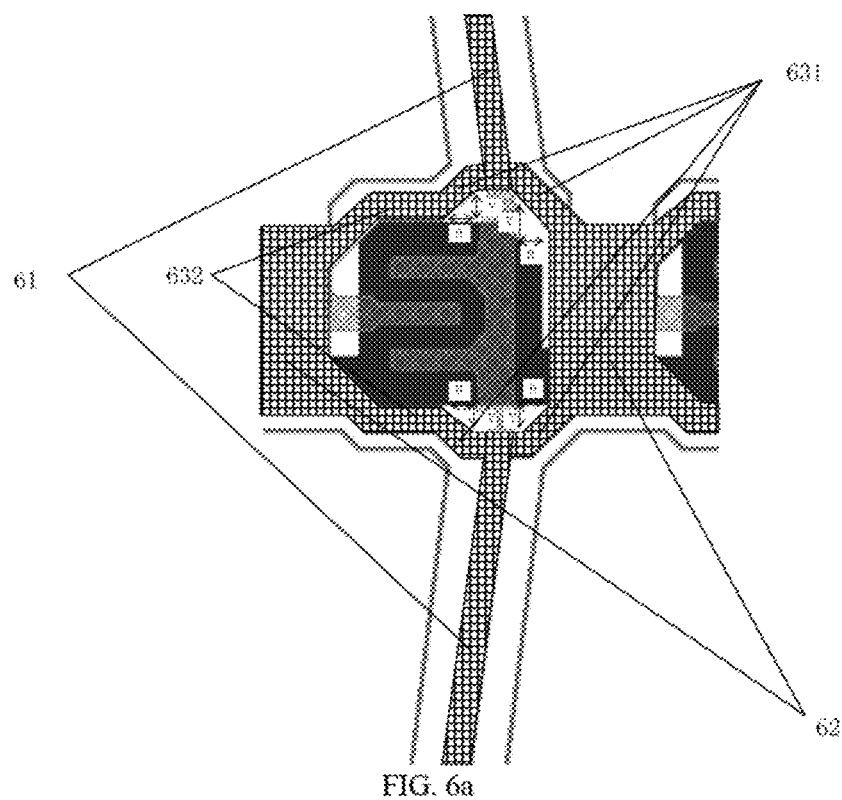
FIG. 6a illustrates a schematic diagram of a partial planar structure of a display substrate according to an embodiment.
Figure 6B:
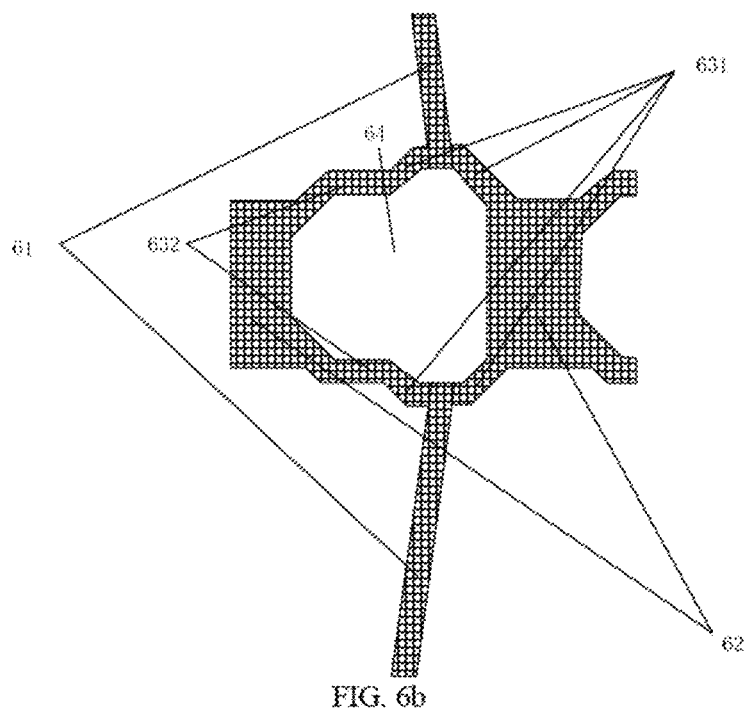
FIG. 6b illustrates a schematic diagram of a planar structure of a common electrode metal layer according to an embodiment.

Referring to FIG. 6a, it illustrates a schematic diagram of a partial planar structure of the display substrate according to this embodiment. Referring to FIG. 6b, it illustrates a schematic diagram of a planar structure of a common electrode metal layer according to this embodiment. The plurality of metal line segments includes first metal line segments 61 and second metal line segments 62, the first metal line segments 61 extend along the direction of the data lines, and orthographic projections of the first metal line segments 61 on the base substrate overlap orthographic projections of the data lines on the base substrate 41; and the second metal line segments 62 extend along the direction of the gate lines, and orthographic projections of the second metal line segments 62 on the base substrate overlap orthographic projections of the gate lines on the base substrate 41.

The connecting line segments 63 are configured to connect the adjacent first and second metal line segments 61 and 62, each of the connecting line segments 63 is provided with a maintenance line segment 631, orthographic projections of the maintenance line segments 631 on the base substrate 41 do not overlap the orthographic projections of the gate lines and data lines on the base substrate 41 respectively, and a spacing between the orthographic projections of the maintenance line segments on the base substrate and the orthographic projections of the gate lines and data lines on the base substrate is greater than or equal to a preset distance, wherein the preset distance is greater than zero.

Two adjacent second metal line segments 62 and the connecting line segments 62 connected to and disposed between the two adjacent second metal line segments 62 jointly define a hollow area 64 as illustrated in FIG. 6b.

As illustrated in FIG. 6a, the maintenance line segments 631 do not overlap orthographic projections of the gate lines on the base substrate 41, with a spacing V; and the maintenance line segments 631 do no overlap orthographic projections of the data lines on the base substrate 41, with a spacing H. The spacing V and the spacing H are both greater than or equal to the preset distance. As such, shorting caused by false cutting of the gate lines or the data lines during the process of cutting the maintenance line segments 631 by laser may be prevented.

In the specific implementation, the preset distance may be, for example, greater than or equal to 5 μm; and a specific value of the preset distance may be set according to an actual process, which is not defined in this embodiment.

Each connection illustrated in FIG. 6a is provided with four connecting line segments 63, and both ends of each of the connecting line segments 63 are connected to first and second metal line segments 61 and 62 adjacent thereto.

In the specific implementation, each connecting line segment may be further provided with a non-maintenance line segment 632; and the non-maintenance line segments 632 and the orthographic projections of the gate lines on the base substrate 41 may have a spacing less than the preset distance therebetween or may be partially overlapped. The non-maintenance line segments 632 and the orthographic projections of the data lines on the base substrate 41 may have a spacing less than the preset distance therebetween or may be partially overlapped.

In the specific implementation, referring to FIGS. 6a and 6b, overlapped areas of the orthographic projections of the gate lines and the data lines on the base substrate 41 may be within the hollow area 64.

Figure 7:
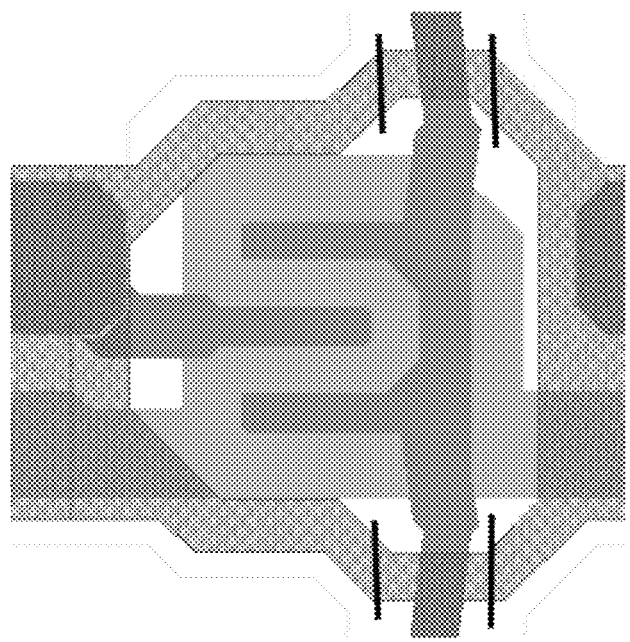
FIG. 7 illustrates a schematic diagram of a principle for maintaining a display substrate according to an embodiment.
Figure 8:
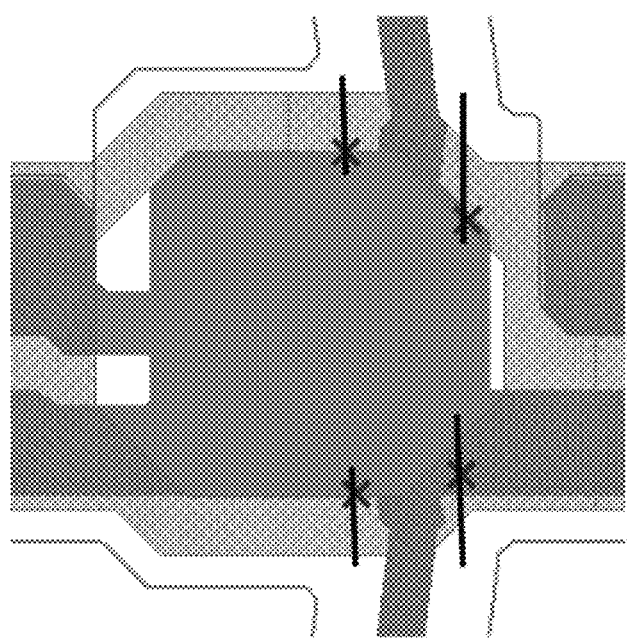
FIG. 8 illustrates a schematic diagram of a principle for maintaining a display substrate in the related art.

Since no overlapping exists between the maintenance line segments 631 and the gate lines and between the maintenance line segments 631 and the data lines, and a spacing between the orthographic projections of the maintenance line segments on the base substrate and the orthographic projections of the gate lines and data lines on the base substrate is greater than or equal to the preset distance, referring to FIG. 7, cutting the maintenance line segments 631 will not lead to shorting between the common electrode metal layer 46 and the gate lines or the data lines. Referring to FIG. 8, it illustrates the schematic diagram of the principle of maintaining the display substrate in the related art. Since the spacing between the common electrode metal layer and the gate lines or data lines is less than the predefined threshold, cutting the common electrode metal layer may cause shorting between the common electrode metal layer and the gate lines or the data lines.

In this embodiment, connecting line segments on a periphery of a TFT device are expanded outwards to form maintenance line segments that do not overlap either the gate lines or the data lines, and connections obtained by the subsequent outward expansion of the connecting line segments are named "maintenance rings". By using a method of cutting off or borrowing lines from the "maintenance rings", the maintenance of the gate lines or data lines with respect to various types of disconnection or disconnection-like faults is realized. Through experiments, the inventor has verified that by using the display substrate according to this embodiment, a product yield may be obviously improved through maintenance; and if device statuses fluctuate during the mass production, even greater improvement of the yield will be brought about by the maintenance.

For the display substrate according to this embodiment, since no overlapping exists both between the maintenance line segments and the gate lines and between the maintenance line segments and the data lines, shorting between the common electrode metal layer and the gate or data lines may be not caused by cutting off the maintenance line segments to isolate the metal line segment. Therefore, the cut-off and isolated metal line segment may be used in the maintenance specific to abnormalities in the display substrate, thereby improving the yield.

In the specific implementation, as illustrated in FIG. 6a and FIG. 6b, the maintenance line segments 631 may be disposed at any position on the connecting line segments 63. To improve the aperture rate and prevent the maintenance line segments 631 from blocking an open area, in an optional implementation manner, the maintenance line segments 631 may be disposed close to the first metal line segments 61.

Optionally, as illustrated in FIG. 6a and FIG. 6b, an extension direction of the maintenance line segments 631 may be in parallel with the gate lines.

In an optional implementation manner, a material of a third insulating layer 47 may include an organic insulating material. The material of the third insulating layer 47 may be for example photoresist, therefore, film layers with greater thickness may be formed, thereby reducing the coupling capacitance between the film layers and reducing the power consumption. The thickness of the third insulating layer may be greater than or equal to 2000 Å.

In an optional implementation manner, referring to FIG. 4 and FIG. 5, the display substrate may further include: the third insulating layer 47 and a pixel electrode layer 48 which are laminated between the second metal layer 44 and the second insulating layer 45, wherein the third insulating layer 47 is disposed close to the second metal layer 44, and the pixel electrode layer 48 includes a plurality of pixel electrodes; and a plurality of source-drain electrodes provided at each of the data lines, each of which is connected to the pixel electrode corresponding thereto via a via hole disposed in the third insulating layer 47.

In an optional implementation manner, referring to FIG. 4 and FIG. 5, the display substrate may further include: a common electrode layer 49 disposed on one side of the common electrode metal layer 46 away from the base substrate 41.

Figure 9:
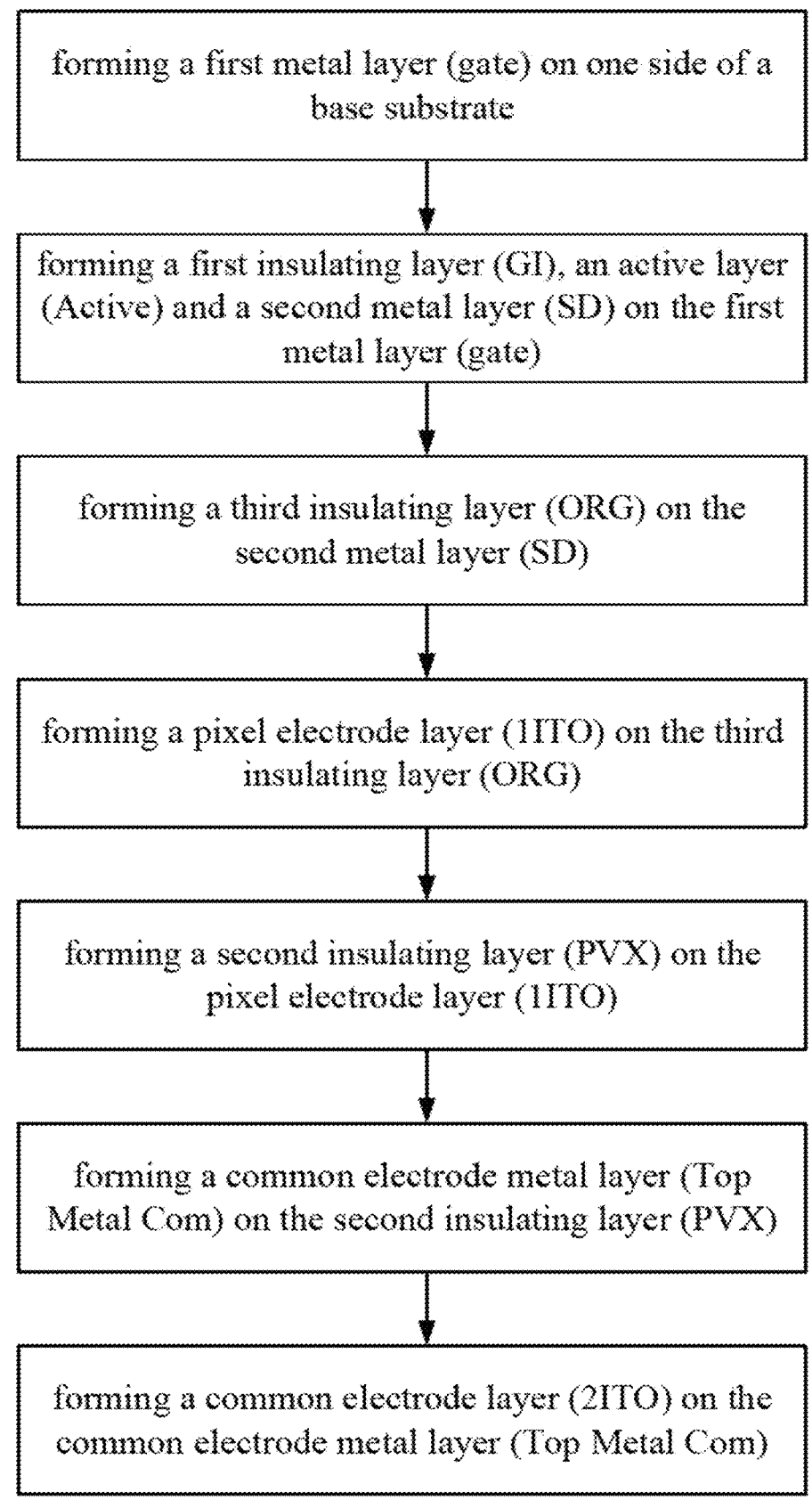
FIG. 9 illustrates a flowchart of a process of preparing a display substrate according to an embodiment.
Figure 10A:
FIG. 10a illustrates a schematic diagram of a planar structure after the preparation of a first metal layer is completed according to an embodiment.
Figure 10A:
Figure 10B:
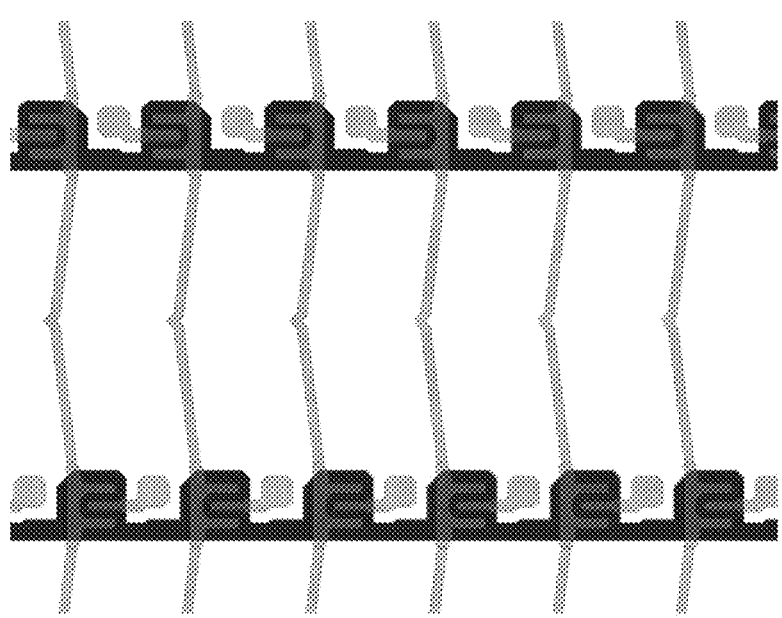
FIG. 10b illustrates a schematic diagram of a planar structure after the preparation of a second metal layer is completed according to an embodiment.
Figure 10C:
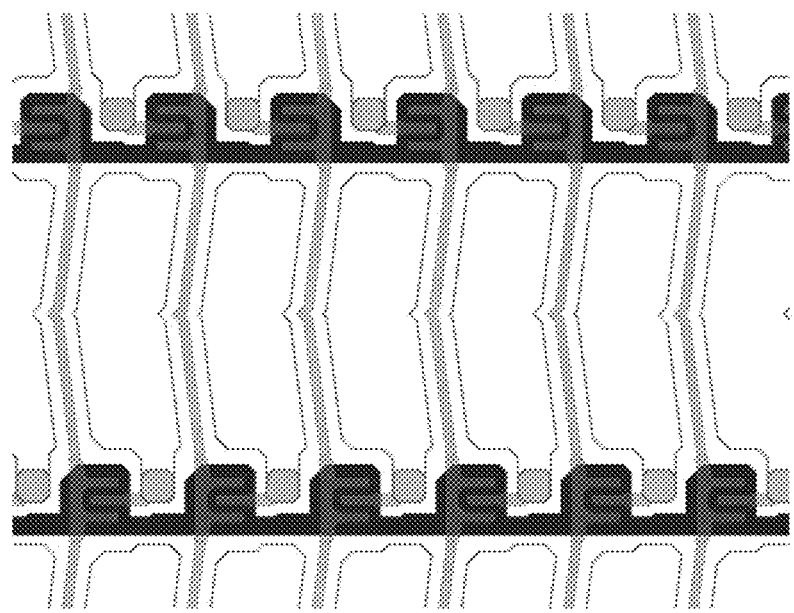
FIG. 10c illustrates a schematic diagram of a planar structure after the preparation of a pixel electrode layer is completed according to an embodiment.
Figure 10D:
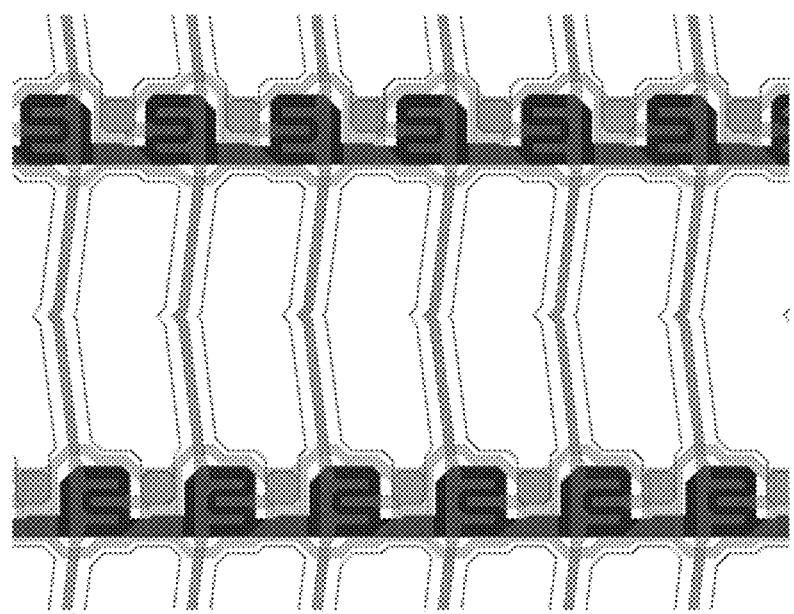
FIG. 10d illustrates a schematic diagram of a planar structure after the preparation of a common electrode metal layer is completed according to an embodiment.
Figure 10E:
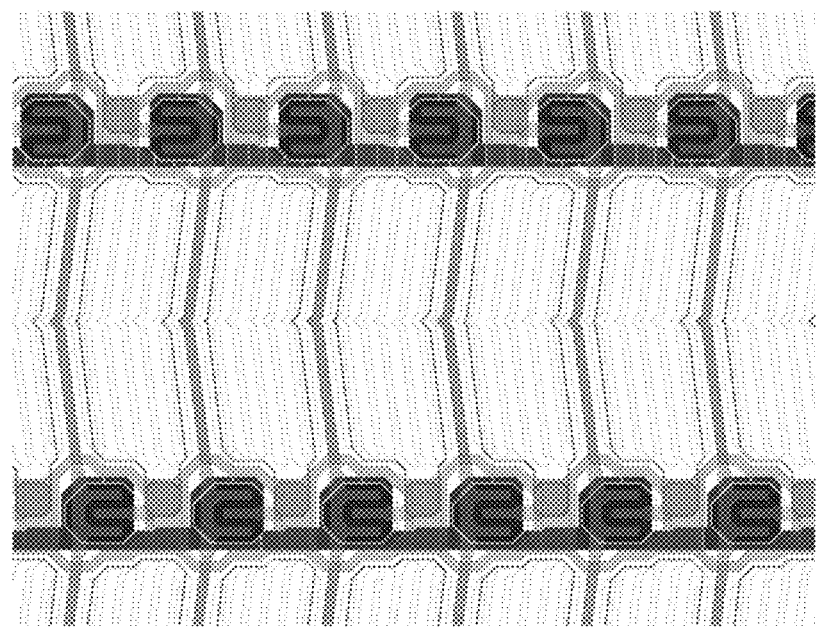
FIG. 10e illustrates a schematic diagram of a planar structure after the preparation of a common electrode layer is completed according to an embodiment.

Referring to FIG. 9, it illustrates a flowchart of a process of preparing a display substrate according to this embodiment. A specific preparation process is as follows: a first metal layer gate, a first insulating layer (GI), an active layer (active), a second metal layer (SD), a third insulating layer (ORG), a pixel electrode layer (IITO), a second insulating layer (PVX), a common electrode metal layer (Top Metal Com) and a common electrode layer (2ITO0 are sequentially formed on one side of the base substrate. Referring to FIG. 10a, it illustrates a schematic diagram of a planar structure after the first metal layer is completed. Referring to FIG. 10b, it illustrates a schematic diagram of a planar structure after the second metal layer is completed. Referring to FIG. 10c, it illustrates a schematic diagram of a planar structure after the pixel electrode layer is completed. Referring to FIG. 10d, it illustrates a schematic diagram of a planar structure after the common electrode metal layer is completed. Referring to FIG. 10e, it illustrates a schematic diagram of a planar structure after the common electrode layer is completed.

Several other embodiments in which the display substrate according to this embodiment is applied for maintenance are introduced below.

Figure 11:
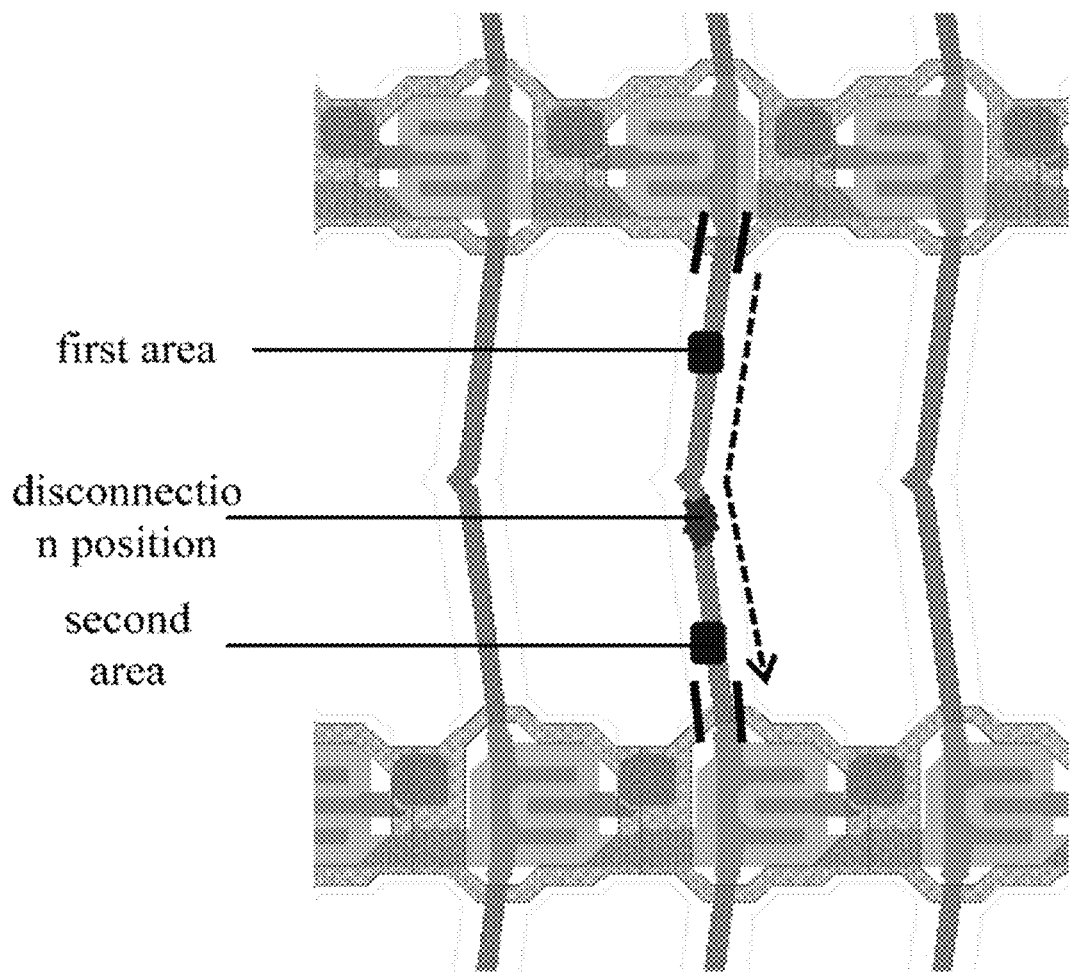
FIG. 11 illustrates a schematic diagram of a method for maintaining a first type of display substrate according to an embodiment.

If a disconnection fault occurs to a data line on the display substrate, as illustrated in FIG. 11, the maintenance line segments on the four connecting line segments connected to the first metal line segment at a disconnection position may be cut by laser to isolate the first metal line segment, with cutting positions indicated by short black lines in FIG. 11. Then, zapping is performed at both sides of the disconnection position, and silver or tungsten powder is then poured into holes to connect the data line to the isolated first metal line segment, thereby realizing maintenance for the disconnection fault of the data line.

Figure 12:
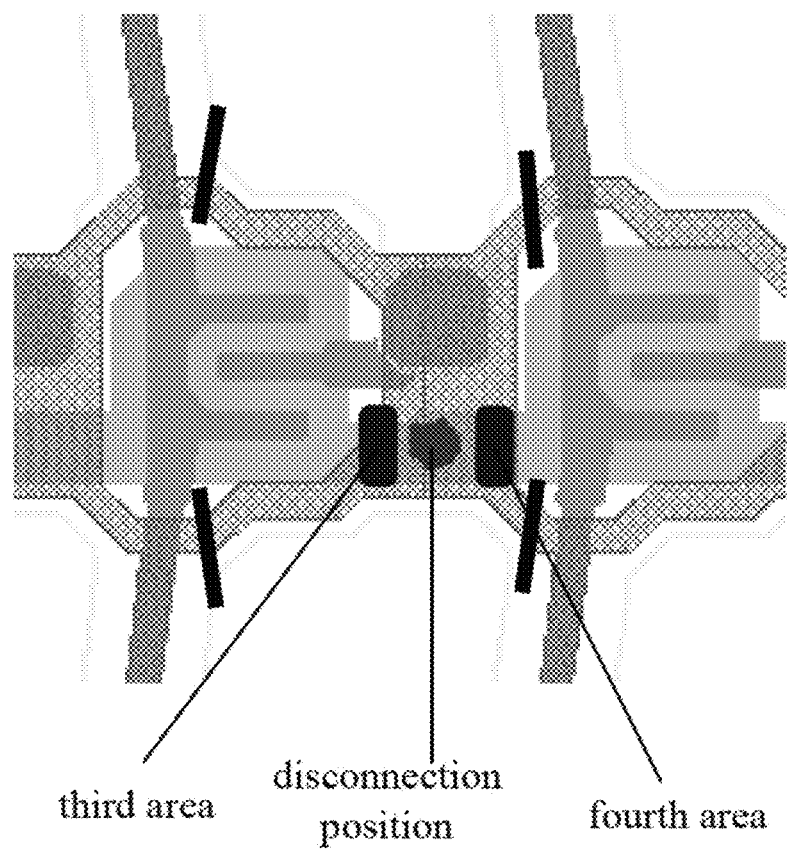
FIG. 12 illustrates a schematic diagram of a method for maintaining a second type of display substrate according to an embodiment.

Similarly, if a disconnection fault occurs to a gate line on the display substrate, as illustrated in FIG. 12, the maintenance line segments on the four connecting line segments connected to the second metal line segment at a disconnection position may be cut by laser to isolate the second metal line segment, with cutting positions indicated by short black lines in FIG. 12. Then, zapping is performed at both sides of the disconnection position, and silver or tungsten powder is then poured into holes to connect the gate line to the isolated first metal line segment, thereby realizing maintenance for the disconnection fault of the gate line.

Figure 13:
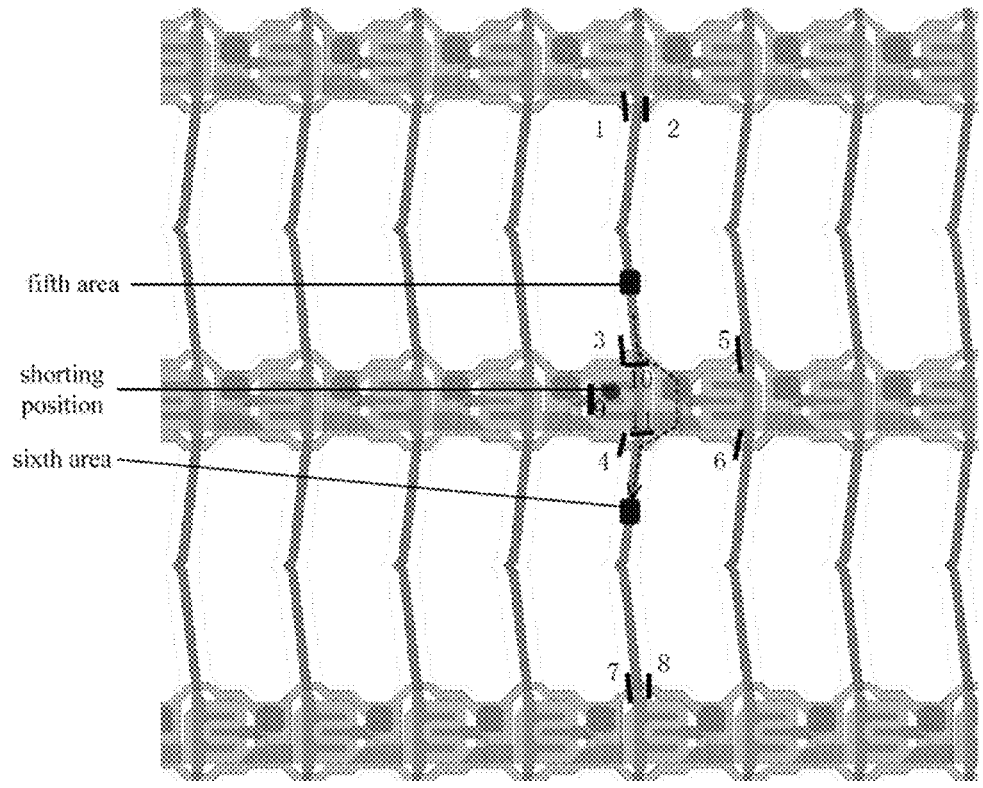
FIG. 13 illustrates a schematic diagram of a method for maintaining a third type of display substrate according to an embodiment.

If a shorting fault occurs between a gate line and a data line on the display substrate, as illustrated in FIG. 13, the maintenance line segments between two first metal line segments and one second metal line segment, closest to a shorting position, and other metal line segments may be cut by laser, with cutting positions indicated by short black lines (1-8) in FIG. 13. Then, zapping is performed at both sides of the shorting position, and silver or tungsten powder is then poured into holes to connect the shorted data line to the two first metal line segments respectively, thereby realizing maintenance for the shorting fault between the gate line and the data line. In addition, to prevent signal crosstalk, the shorting position may be disconnected from the pixel electrode and the data line respectively, and for the specific cutting positions, a reference may be made to the embodiment followed.

Figure 14:
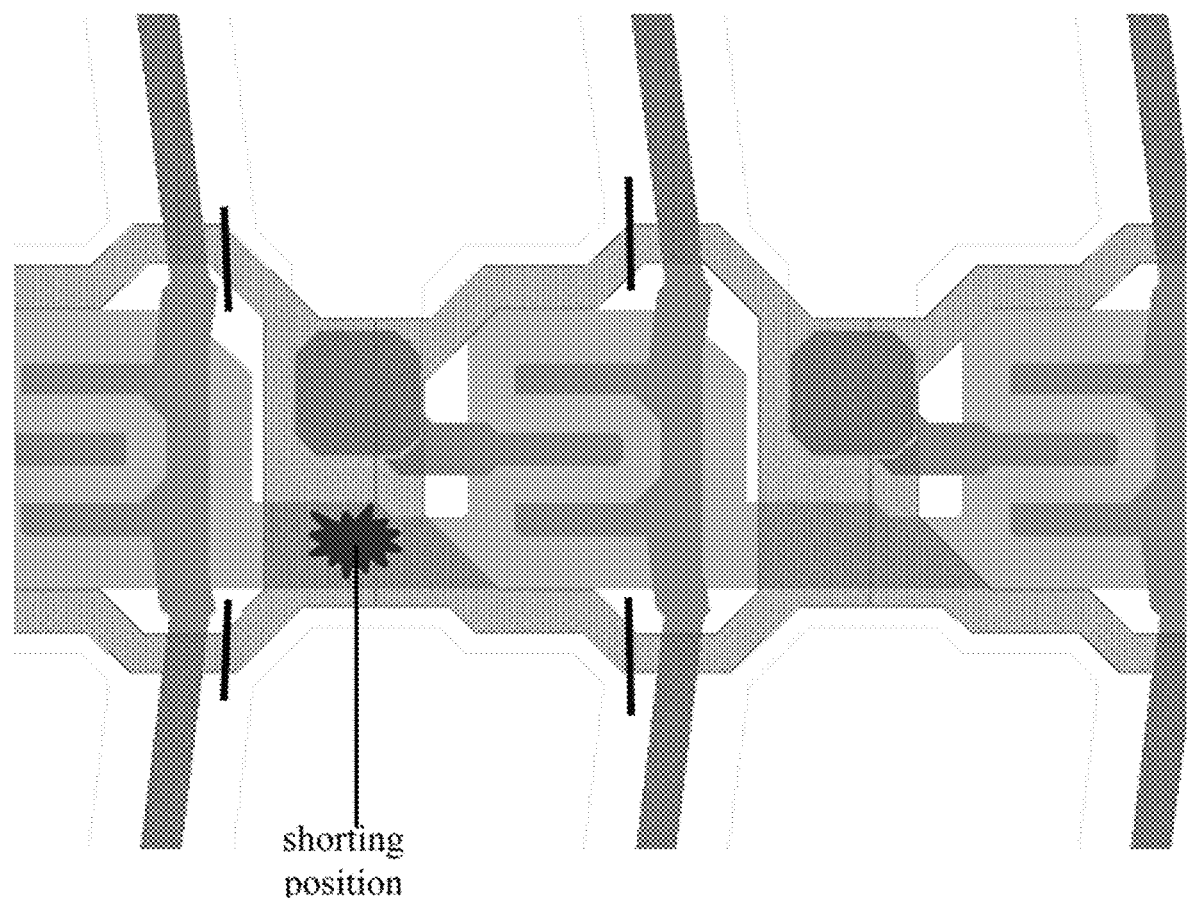
FIG. 14 illustrates a schematic diagram of a method for maintaining a fourth type of display substrate according to an embodiment.

If shorting occurs between a gate line and a second metal line segment on the display substrate, the maintenance line segments on the four connecting line segments connected to the shorted second metal line segment may be cut by laser to isolate the second metal line segment, with cutting positions as indicated by short black lines in FIG. 14, whereby the maintenance is realized for the shorting fault between the gate line and the second metal line segment.

Figure 15:
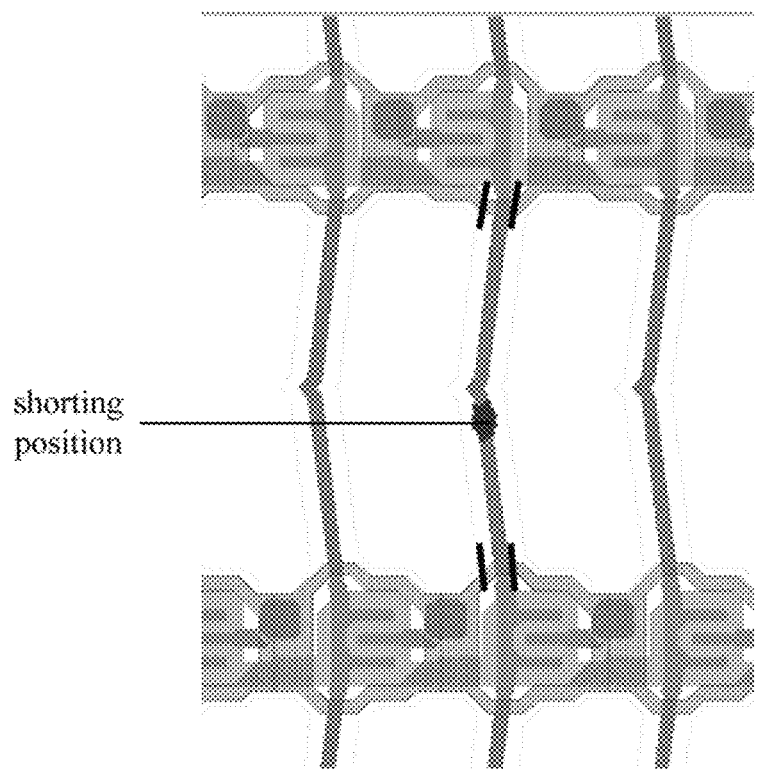
FIG. 15 illustrates a schematic diagram of a method for maintaining a fifth type of display substrate according to an embodiment.

Similarly, if shorting occurs to a data line and a first metal line segment on the display substrate, the maintenance line segments on the four connecting line segments connected to the shorted first metal line segment may be cut by laser to isolate the first metal line segment, with cutting positions as indicated by short black lines in FIG. 15, whereby the maintenance is realized for the shorting fault between the gate line and the first metal line segment.

After the maintenance described above is completed, a material for the common electrode layer on the periphery of the isolated metal line segment may be also scraped and removed by laser, preventing shorting between the isolated metal line segment and the common electrode layer. For the specific scraping and removing positions, a reference may be made to the description of the following embodiment.

Another embodiment of the present disclosure further provides a display device, which includes the display substrate described in any one of the embodiments.

It should be noted that the display device in this embodiment may be any product or component having a 2D or 3D display function, for example, a display panel, a piece of electronic paper, a mobile phone, a tablet computer, a television, a notebook computer, a digital photo frame, a navigator, or the like.

Another embodiment of the present disclosure further provides a method for maintaining a display substrate for eliminating abnormalities in the display substrate described in any one of the embodiments. The method includes the following steps.

First, a type and a position of an abnormality are acquired, and a target metal line segment is determined based on the type and position of the abnormality; and then, maintenance line segments between the target metal line segment and other metal line segments are cut off to isolate the target metal line segment, and maintenance is performed specific to the abnormality by using the isolated target metal line segment.

The target metal line segment may include one or more metal line segments, and said other metal line segments are metal line segments among the plurality of metal line segments other than the target metal line segment. By cutting off the maintenance line segments between the target metal line segment and other metal line segments, the isolated target metal line segment may be obtained, so that the target metal line segment and other metal line segments are insulated from each other.

In an optional implementation manner, referring FIG. 11, when the type of abnormality is disconnection of a first data line, the target metal line segment is a first metal line segment overlapping an orthographic projection of a disconnection position on the base substrate; the first data line includes a first data line segment and a second data line segment which are disposed at both ends of the disconnection position; and the method further includes:

zapping a first area and a second area respectively, and pouring metal powder into holes so that the first data line segment and the second data line segment are connected to the target metal line segment respectively, wherein an orthographic projection of the first area on the base substrate overlaps orthographic projections of the target metal line segment and the first data line segment on the base substrate respectively, and an orthographic projection of the second area on the base substrate overlaps orthographic projections of the target metal line segment and the second data line segment on the base substrate respectively.

The first data line is a data line undergoing disconnection. A disconnection position divides the first data line into a first data line segment and a second data line segment. As illustrated in FIG. 11, the first data line segment may be a portion of the first data line above the disconnection position, and the second data line segment may be a portion of the first data line below the disconnection position.

An orthographic projection of the first area on the base substrate overlaps an orthographic projection of the target metal line segment on the base substrate, and the orthographic projection of the first area on the base substrate overlaps an orthographic projection of the first data line segment on the base substrate. An orthographic projection of the second area on the base substrate overlaps the orthographic projection of the target metal line segment on the base substrate, and the orthographic projection of the second area on the base substrate overlaps an orthographic projection of the second data line segment on the base substrate.

In the specific implementation, if a disconnection fault occurs to the first data line on the display substrate, as illustrated in FIG. 11, the maintenance line segments (4 in total) between the target metal line segment and other metal line segments may be cut by laser to isolate the target metal line segment, with cutting positions indicated by the short black lines in FIG. 11. Then, zapping is performed on the first area and the second area at both sides of the disconnection position, and silver or tungsten powder is then poured into holes to connect both disconnected ends of the first data line to the target metal line segment, thereby realizing maintenance for the disconnection fault of the data line, wherein the dotted arrow in FIG. 11 indicates a transmission direction of data signals after the maintenance.

In an optional implementation manner, referring to FIG. 12, when the type of the abnormality is shorting of a first gate line, the target metal line segment is a second metal line segment overlapping an orthographic projection of a shorting position on the base substrate; the first data line includes a first gate line segment and a second gate line segment which are disposed at both ends of the shorting position; and the method further includes:

zapping a third area and a fourth area respectively, and pouring metal powder into holes so that the first gate line segment and the second gate line segment are connected to the target metal line segment respectively, wherein an orthographic projection of the third area on the base substrate overlaps orthographic projections of the target metal line segment and the first gate line segment on the base substrate respectively, and an orthographic projection of the fourth area on the base substrate overlaps orthographic projections of the target metal line segment and the second gate line segment on the base substrate respectively.

The first gate line is a gate line undergoing disconnection. The disconnection position divides the first gate line into a first gate line segment and a second gate line segment. As illustrated in FIG. 12, the first gate line segment may be a portion of the first gate line on the left of the disconnection position, and the second gate line segment may be a portion of the first gate line on the right of the disconnection position.

An orthographic projection of the third area on the base substrate overlaps an orthographic projection of the target metal line segment on the base substrate, and the orthographic projection of the third area on the base substrate overlaps an orthographic projection of the first gate line segment on the base substrate. An orthographic projection of the fourth area on the base substrate overlaps the orthographic projection of the target metal line segment on the base substrate, and the orthographic projection of the fourth area on the base substrate overlaps an orthographic projection of the second gate line segment on the base substrate.

In the specific implementation, if a disconnection fault occurs to a first gate line on the display substrate, as illustrated in FIG. 12, the maintenance line segments (4 in total) between the target metal line segment and other metal line segments may be cut by laser to isolate the target metal line segment, with cutting positions indicated by the short black line in FIG. 12. Then, zapping is performed on the third area and the fourth area at both sides of the disconnection position, and silver or tungsten powder is then poured into holes to connect both disconnected ends of the first gate line to the target metal line segment, thereby realizing maintenance for the disconnection fault of the gate line.

In an optional implementation manner, referring to FIG. 13, when the type of the abnormality is shorting between a second gate line and a second data line, the target metal line segment includes two first metal line segments overlapping an orthographic projection of the second data line on the base substrate and close to a shorting position, and one second metal line segment overlapping an orthographic projection of the second gate line on the base substrate and close to the shorting position; and the method further includes:

zapping a fifth area and a sixth area respectively, and pouring metal powder into holes so that the two first metal line segments are connected to the second data line respectively, wherein an orthographic projection of the fifth area on the base substrate overlaps orthographic projections of one of the first metal line segments in the target metal line segment and the second data line on the base substrate respectively, and an orthographic projection of the sixth area on the base substrate overlaps orthographic projections of the other of the first metal line segments in the target metal line segment and the second data line on the base substrate respectively.

The second gate line is a gate line undergoing shorting, and the second data line is a data line undergoing shorting. The two first metal line segments are disposed at both sides of the shorting position respectively.

An orthographic projection of the fifth area on the base substrate overlaps an orthographic projection of one of the first metal line segments, in the target metal line segment, on the base substrate, and the orthographic projection of the fifth area on the base substrate overlaps an orthographic projection of the second data line on the base substrate. An orthographic projection of the sixth area on the base substrate overlaps the orthographic projection of the other of the first metal line segments, in the target metal line segment, on the base substrate, and the orthographic projection of the sixth area on the base substrate overlaps the orthographic projection of the second data line on the base substrate.

In the specific implementation, if a shorting fault occurs between a second gate line and a second data line on the display substrate, as illustrated in FIG. 13, the maintenance line segments (8 in total) between the target metal line segment and other metal line segments may be cut by laser to isolate the target metal line segment, with cutting positions indicated by the short black lines (1-8) in FIG. 13. Then, zapping is performed on the fifth area and the sixth area at both sides of the disconnection position, and silver or tungsten powder is then poured into holes to connect the second data line to the two first metal line segments in the target metal line segment, thereby realizing maintenance for the disconnection fault of the data line. The dotted arrow in FIG. 13 indicates a transmission direction of data signals after the maintenance.

To prevent signal crosstalk, the method in this implementation manner may further include:

cutting off conductive paths between two connecting points and the shorting position on the second data line respectively, and a conductive path between the shorting position and the first pixel electrode, wherein the connecting points are areas in which the second data line is connected to the first metal line segments in the target metal line segment; and the first pixel electrode is a pixel electrode connected to the first source-drain electrode, which is a source-drain electrode disposed between the two connecting points.

The two connecting points are disposed within the fifth area and the sixth area respectively. The orthographic projection of a cutting point, on the second data line, on the base substrate does not overlap the orthographic projections of the gate line and the common electrode metal layer on the base substrate. By cutting three point positions (short black lines 9-11) on the second data line, shorted fault points may be isolated.

In an optional implementation manner, when the type of the abnormality is shorting between a third gate line and the second metal line segment, the target metal line segment is the second metal line segment undergoing shorting. Referring to FIG. 14, it is sufficient to only cut off the maintenance line segments on the four connecting line segments of the target metal line segment.

In an optional implementation manner, when the type of the abnormality is shorting between a third data line and the first metal line segment, the target metal line segment is the first metal line segment undergoing shorting. Referring to FIG. 15, it is sufficient to only cut off the maintenance line segments on the four connecting line segments of the target metal line segment.

In an optional implementation manner, the common electrode layer may include a repair area, a non-repair area, and an isolation area between the repair-area and the non-repair area; and an orthographic projection of the repair area on the base substrate covers the orthographic projection on the base substrate. The method may further include: removing material of the common electrode layer in the isolation area.

The metal powder in this embodiment may include at least one of silver powder and tungsten powder.

It should be noted that the order of the step of cutting the maintenance line segments, the step of cutting the data lines, the step of zapping and pouring the metal powder and the step of removing the material of the common electrode material in the embodiments may be adjusted based on actual needs, which is not limited in the embodiments.

The embodiments provide a method for maintaining a display substrate, the display substrate, and a display device. The display substrate includes: a base substrate, as well as a first metal layer, a first insulating layer and a second metal layer which are laminated on one side of the base substrate, wherein the first metal layer includes a plurality of gate lines, and the second metal layer includes a plurality of data lines; a second insulating layer and a common electrode metal layer which are laminated on one side of the second metal layer away from the base substrate, wherein the second insulating layer is disposed close to the base substrate, and the common electrode metal layer includes a plurality of metal line segments and a plurality of connecting line segments; wherein the plurality of metal line segments include first metal line segments and second metal line segments, the first metal line segments extend along the direction of the data lines, and orthographic projections of the first metal line segments on the base substrate overlap orthographic projections of the data lines on the base substrate; the second metal line segments extend along the direction of the gate lines, and orthographic projections of the second metal line segments on the base substrate overlap orthographic projections of the gate lines on the base substrate; the connecting line segments are configured to connect the adjacent first and second metal line segments, each of the connecting line segment is provided with a maintenance line segment, orthographic projections of the maintenance line segments on the base substrate do not overlap the orthographic projections of the gate lines and data lines on the base substrate respectively, and a spacing between the orthographic projections of the maintenance line segments on the base substrate and the orthographic projections of the gate lines and data lines on the base substrate is greater than or equal to a preset distance, wherein the preset distance is greater than zero; and two adjacent second metal line segments and the connecting line segments connected to and disposed between the two adjacent second metal line segments jointly define a hollow area. Since no overlapping exists both between the maintenance line segments and the gate lines and between the maintenance line segments and the data lines, shorting between the common electrode metal layer and the gate or data lines may be not caused by cutting off the maintenance line segments to isolate the metal line segments. Therefore, the cut-off and isolated metal line segments may be used in maintenance specific to abnormalities in the display substrate, thereby improving the yield.

The embodiments in the specification are described in a progressive fashion, with each embodiment focusing on the description of its differences from other embodiments. The embodiments may refer to each other for the same or similar parts.

Finally, it should also be noted that, as used herein, relational terms such as first and second are only intended to distinguish one entity or operation from another entity or operation, and do not necessarily require or imply any such actual relationship or order between these entities or operations. Moreover, the terms "comprise", "include", or any other variants thereof are intended to cover non-exclusive inclusion, so that a process, method, commodity, or device including a sequence of elements not only includes those elements, but also includes other elements that are not explicitly listed, or also includes elements inherent to such a process, method, commodity, or device. In the absence of more limitations, an element defined by a statement "comprising a . . . " does not exclude the existence of other identical elements in the process, method, commodity, or device including said element.

The method for maintaining a display substrate, the display substrate, and a display device according to the present disclosure have been described in detail above. Specific examples are used herein to elaborate the principles and embodiments of the present disclosure. The embodiments are described above merely for the purpose of helping understand the method and the core concept of the present disclosure. Meanwhile, for a person of ordinary skill in the art, there will be changes to the specific embodiments and the application scope based on the concept of the present disclosure. In summary, the content of the specification should not be understood as limiting the present disclosure.

The invention claimed is:

1. A display substrate, comprising:
a base substrate, as well as a first metal layer, a first insulating layer, and a second metal layer which are laminated on one side of the base substrate, wherein the first metal layer comprises a plurality of gate lines, and the second metal layer comprises a plurality of data lines; and
a second insulating layer and a common electrode metal layer which are laminated on one side of the second metal layer away from the base substrate, wherein the second insulating layer is disposed close to the base substrate, and the common electrode metal layer comprises a plurality of metal line segments and a plurality of connecting line segments;
wherein the plurality of metal line segments comprises first metal line segments and second metal line segments, the first metal line segments extend along a direction of the data lines, and orthographic projections of the first metal line segments on the base substrate overlap orthographic projections of the data lines on the base substrate;
the second metal line segments extend along a direction of the gate lines, and orthographic projections of the second metal line segments on the base substrate overlap orthographic projections of the gate lines on the base substrate;

the connecting line segments are configured to connect the adjacent first and second metal line segments, each of the connecting line segments is provided with a maintenance line segment, orthographic projections of the maintenance line segments on the base substrate do not overlap the orthographic projections of the gate lines and data lines on the base substrate respectively, and a spacing between the orthographic projections of the maintenance line segments on the base substrate and the orthographic projections of the gate lines and data lines on the base substrate is greater than or equal to a preset distance, wherein the preset distance is greater than zero; and two adjacent second metal line segments and the connecting line segments connected to and disposed between the two adjacent second metal line segments jointly define a hollow area.

2. The display substrate according to claim 1, wherein the preset distance is greater than or equal to 5 μm.

3. The display substrate according to claim 1, wherein the maintenance line segments are disposed close to the first metal line segments.

4. The display substrate according to claim 3, wherein an extension direction of the maintenance line segments is parallel to the gate lines.

5. The display substrate according to claim 1, further comprising:
a third insulating layer and a pixel electrode layer laminated between the second metal layer and the second insulating layer, wherein the third insulating layer is disposed close to the second metal layer, and the pixel electrode layer comprises a plurality of pixel electrodes;
a plurality of source-drain electrodes provided at each of the data lines, each of which is connected to the pixel electrode corresponding thereto via a via hole disposed in the third insulating layer; and
a common electrode layer disposed at one side of the common electrode metal layer away from the base substrate.

6. The display substrate according to claim 5, wherein a material of the third insulating layer comprises an organic insulating material.

7. The display substrate according to claim 5, wherein a thickness of the third insulating layer is greater than or equal to 2000 Å.

8. The display substrate according to claim 1, wherein each of the connecting line segments is further provided with a non-maintenance line segment, and the a non-maintenance line segment and the orthographic projections of the gate lines or the data lines on the base substrate have a spacing less than the preset distance therebetween or are partially overlapped.

9. The display substrate according to claim 1, wherein overlapped areas of the orthographic projections of the gate lines and the data lines on the base substrate is within the hollow area.

10. A display device, comprising the display substrate according to claim 1.

11. A method for maintaining a display substrate to perform maintenance specific to an abnormality in the display substrate according to claim 1, the method comprising:

acquiring a type and position of the abnormality and determining a target metal line segment based on the type and position of the abnormality; and cutting off maintenance line segments between the target metal line segment and other metal line segments to isolate the target metal line segment, and performing maintenance specific to the abnormality by using the target metal line segment, wherein said other metal line segments are the metal segments among the plurality of metal line segments other than the target metal line segment.

12. The method according to claim 11, wherein when the type of the abnormality is disconnection of a first data line, the target metal line segment is a first metal line segment overlapping an orthographic projection of a disconnection position on the base substrate;

the first data line comprises a first data line segment and a second data line segment which are disposed at both ends of the disconnection position; and the method further comprises:

zapping a first area and a second area respectively, pouring metal powder into holes so that the first data line segment and the second data line segment are connected to the target metal line segment respectively, wherein an orthographic projection of the first area on the base substrate overlaps orthographic projections of the target metal line segment and the first data line segment on the base substrate respectively, and an orthographic projection of the second area on the base substrate overlaps orthographic projections of the target metal line segment and the second data line segment on the base substrate respectively.

13. The method according to claim 12, wherein the metal powder includes at least one of silver powder and tungsten powder.

14. The method according to claim 11, wherein when the type of the abnormality is shorting of a first gate line, the target metal line segment is a second metal line segment overlapping an orthographic projection of a shorting position on the base substrate;

the first data line comprises a first gate line segment and a second gate line segment which are disposed at both ends of the shorting position; and the method further comprises:

zapping a third area and a fourth area respectively, pouring metal powder into holes so that the first gate line segment and the second gate line segment are connected to the target metal line segment respectively, wherein an orthographic projection of the third area on the base substrate overlaps orthographic projections of the target metal line segment and the first gate line segment on the base substrate respectively, and an orthographic projection of the fourth area on the base substrate overlaps orthographic projections of the target metal line segment and the second gate line segment on the base substrate respectively.

15. The method according to claim 11, wherein when the type of the abnormality is shorting between a second gate line and a second data line, the target metal line segment comprises two first metal line segments which overlap an orthographic projection of the second data line on the base substrate and are close to a shorting position, and one second metal line segment which overlaps an orthographic projection of the second gate line on the base substrate and is close to the shorting position; and the method further comprises:

zapping a fifth area and a sixth area respectively, and pouring metal powder into holes so that the two first metal line segments are connected to the second data line respectively, wherein an orthographic projection of the fifth area on the base substrate overlaps orthographic projections of one of the first metal line segments in the target metal line segment and the second data line on the base substrate respectively, and an orthographic projection of the sixth area on the base substrate overlaps orthographic projections of the other of the first metal line segments in the target metal line segment and the second data line on the base substrate respectively.

16. The method according to claim 15, further comprising:
cutting off conductive paths between two connecting points and the shorting position on the second data line respectively, and a conductive path between the shorting position and the first pixel electrode, wherein the connecting points are areas in which the second data line is connected to the first metal line segments in the target metal line segment; and the first pixel electrode is a pixel electrode connected to the first source-drain electrode, which is a source-drain electrode disposed between the two connecting points.

17. The method according to claim 11, wherein when the type of the abnormality is shorting between a third gate line and the second metal line segment, the target metal line segment is the second metal line segment undergoing shorting.

18. The method according to claim 11, wherein when the type of the abnormality is shorting between a third data line and the first metal line segment, the target metal line segment is the first metal line segment undergoing shorting.

19. The method according to claim 11, wherein the common electrode layer comprises a repair area, a non-repair area, and an isolation area disposed between the repair area and the non-repair area;
an orthographic projection of the repair area on the base substrate covers the orthographic projection of the target metal line segment on the base substrate; and
the method further comprises:
removing the common electrode layer in the isolation area.

* * * * *